US009188488B2

(12) United States Patent
Engelstad et al.

(10) Patent No.: US 9,188,488 B2
(45) Date of Patent: Nov. 17, 2015

(54) VIBRATION DETECTION IN THERMOWELLS

(71) Applicant: Rosemount Inc., Chanhassen, MN (US)

(72) Inventors: Loren Michael Engelstad, Norwood Young America, MN (US); Jason Harold Rud, Mayer, MN (US)

(73) Assignee: Rosemount Inc., Chanhassen, MN (US)

( * ) Notice: Subject to any disclaimer, the term of this patent is extended or adjusted under 35 U.S.C. 154(b) by 292 days.

(21) Appl. No.: 13/828,603

(22) Filed: Mar. 14, 2013

(65) Prior Publication Data
US 2014/0269828 A1 Sep. 18, 2014

(51) Int. Cl.
G01H 1/00 (2006.01)
G01K 1/08 (2006.01)
G01K 1/00 (2006.01)
G01K 1/02 (2006.01)
G01K 13/02 (2006.01)
G01H 11/06 (2006.01)
G01H 13/00 (2006.01)

(52) U.S. Cl.
CPC .................. *G01K 1/024* (2013.01); *G01H 1/00* (2013.01); *G01H 11/06* (2013.01); *G01H 13/00* (2013.01); *G01K 1/08* (2013.01); *G01K 13/02* (2013.01)

(58) Field of Classification Search
CPC ............. G01K 1/00; G01K 1/08; G01K 1/14; G01K 1/024; G01K 11/22; G01K 13/02; G01K 17/00; G01K 7/00; G01K 7/16; G01K 7/34

USPC ......... 73/514.16, 514.01, 493, 649, 652, 658, 73/661, 861.18, 861.42, 204.11, 861.23, 73/861.355; 702/56, 99, 183
See application file for complete search history.

(56) References Cited

U.S. PATENT DOCUMENTS

| 4,778,538 | A | 10/1988 | Lyman |
| 5,048,323 | A * | 9/1991 | Stansfeld et al. ............. 73/32 A |
| 5,511,427 | A | 4/1996 | Burns |
| 6,082,737 | A * | 7/2000 | Williamson et al. .......... 277/317 |
| 6,485,175 | B1 * | 11/2002 | Nimberger et al. ........... 374/142 |
| 6,601,005 | B1 * | 7/2003 | Eryurek et al. ............... 702/104 |
| 7,385,503 | B1 | 6/2008 | Wells et al. |
| 8,706,448 | B2 * | 4/2014 | Orth ............................ 702/188 |
| 8,793,081 | B1 * | 7/2014 | Loverich et al. ................ 702/42 |
| 2005/0017602 | A1 * | 1/2005 | Arms et al. .................... 310/339 |
| 2005/0072239 | A1 * | 4/2005 | Longsdorf et al. .............. 73/649 |
| 2008/0141769 | A1 | 6/2008 | Schmidt et al. |

(Continued)

FOREIGN PATENT DOCUMENTS

EP 1074825 A1 2/2001
WO WO 2007/006128 A1 1/2007

OTHER PUBLICATIONS

International Search Report and Written Opinion for PCT Application Serial No. PCT/US2014/016454; Dated May 28, 2014, 15 pages.

*Primary Examiner* — Helen Kwok
(74) *Attorney, Agent, or Firm* — Kinney & Lange, P.A.

(57) ABSTRACT

A sensor system comprises a process transducer, a unpowered vibration sensor, and a process transmitter. The process transducer is disposed within a thermowell and configured to produce a first sensor signal. The unpowered vibration sensor is configured to produce a second sensor signal reflecting vibration of the thermowell. The process transmitter is configured to receive, process, and transmit the first and second sensor signals.

22 Claims, 2 Drawing Sheets

(56) References Cited

U.S. PATENT DOCUMENTS

| | | |
|---|---|---|
| 2009/0079200 A1 | 3/2009 | Gieras et al. |
| 2009/0195222 A1 | 8/2009 | Lu et al. |
| 2009/0211368 A1* | 8/2009 | Garnett et al. ............. 73/861.22 |
| 2010/0109331 A1 | 5/2010 | Hedtke et al. |
| 2010/0302008 A1 | 12/2010 | Engelstad et al. |
| 2011/0054822 A1* | 3/2011 | Bauschke et al. ............... 702/99 |
| 2012/0041695 A1* | 2/2012 | Baldwin ......................... 702/56 |
| 2012/0051399 A1* | 3/2012 | Rud et al. ...................... 374/185 |
| 2012/0136627 A1* | 5/2012 | Jensen .......................... 702/182 |
| 2013/0018590 A1* | 1/2013 | Borkholder et al. ............ 702/19 |
| 2013/0283928 A1* | 10/2013 | Wiklund .................... 73/861.18 |
| 2014/0088893 A1* | 3/2014 | McGuire et al. ................ 702/58 |
| 2014/0241399 A1* | 8/2014 | Rud .............................. 374/184 |
| 2014/0269820 A1* | 9/2014 | Perrault et al. ................. 374/54 |
| 2014/0269829 A1* | 9/2014 | Bronczyk et al. ............. 374/152 |

\* cited by examiner

VIBRATION DETECTION IN THERMOWELLS

BACKGROUND

The present invention relates generally to process sensor systems, and more particularly to thermowell sensor housings for fluid sensors in industrial process monitoring systems.

Industrial process transmitters and sensor assemblies are used to sense various characteristics of process fluids flowing through a conduit or contained within a vessel, and to transmit information about those process characteristics to a control, monitoring and/or safety system remotely located from the process measurement location. Each process transmitter may be connected to one or more sensor and/or actuator assembly. Sensor assemblies may sense a variety of process parameters, including pressure, temperature, pH or flow rate. Process transmitters are typically electrically connected sensor assemblies via sensor wires used to transmit current- or voltage-based analog sensor output signals reflecting at least one such process parameter. Each transmitter reads these sensor output signals, and converts them into a measurement of the process parameter. Finally, the transmitter sends the information to the control system.

Sensor assemblies for sensing process fluid temperatures and changes in temperature commonly include at least one temperature sensor housed in a thermowell extending into the fluid flow. Thermowells are designed to be in physical contact with process fluids and to shield the temperature sensor from physical damage caused by direct contact with the fluid, e.g., impacts, corrosion, etc., while efficiently conducting heat between the fluid and the temperature sensor. Thermowell reliability is of critical importance in process monitoring, as broken or damaged thermowells can allow leakage of hazardous process fluids, and expose delicate and/or expensive sensors to process fluids. Severe thermowell damage can cause thermowells to detach, potentially causing further damage to downstream equipment.

Vibration is a principal cause of damage to thermowells and enclosed temperature sensors, making vibration damping and prevention critical to sustained operation of sensor assemblies in process fluids. Impingement of process flow on a thermowell creates turbulence in the process fluid via vortex shedding. This turbulence has a characteristic wake frequency $f_w$ determined by a plurality of factors, including the geometry of the thermowell and conditions and flow rate of the process fluid. Vortex shedding can cause harmful thermowell vibrations when wake frequency $f_w$ is close to $f_r$, a natural resonance frequency of the thermowell. Accordingly, thermowells are often designed using predicted wake frequencies $f_w$ to avoid $f_w = f_r$ resonance conditions. During the lifetime of a thermowell, however, changes in process conditions can cause shifts in $f_w$ and/or $f_r$ that increase the likelihood of resonance conditions.

SUMMARY

The present invention is directed toward a sensor system comprising a process transducer, a unpowered vibration sensor, and a process transmitter. The process transducer is disposed within a thermowell and configured to produce a first sensor signal. The unpowered vibration sensor is configured to produce a second sensor signal reflecting vibration of the thermowell. The process transmitter is configured to receive, process, and transmit the first and second sensor signals.

DETAILED DESCRIPTION

Figure 1:
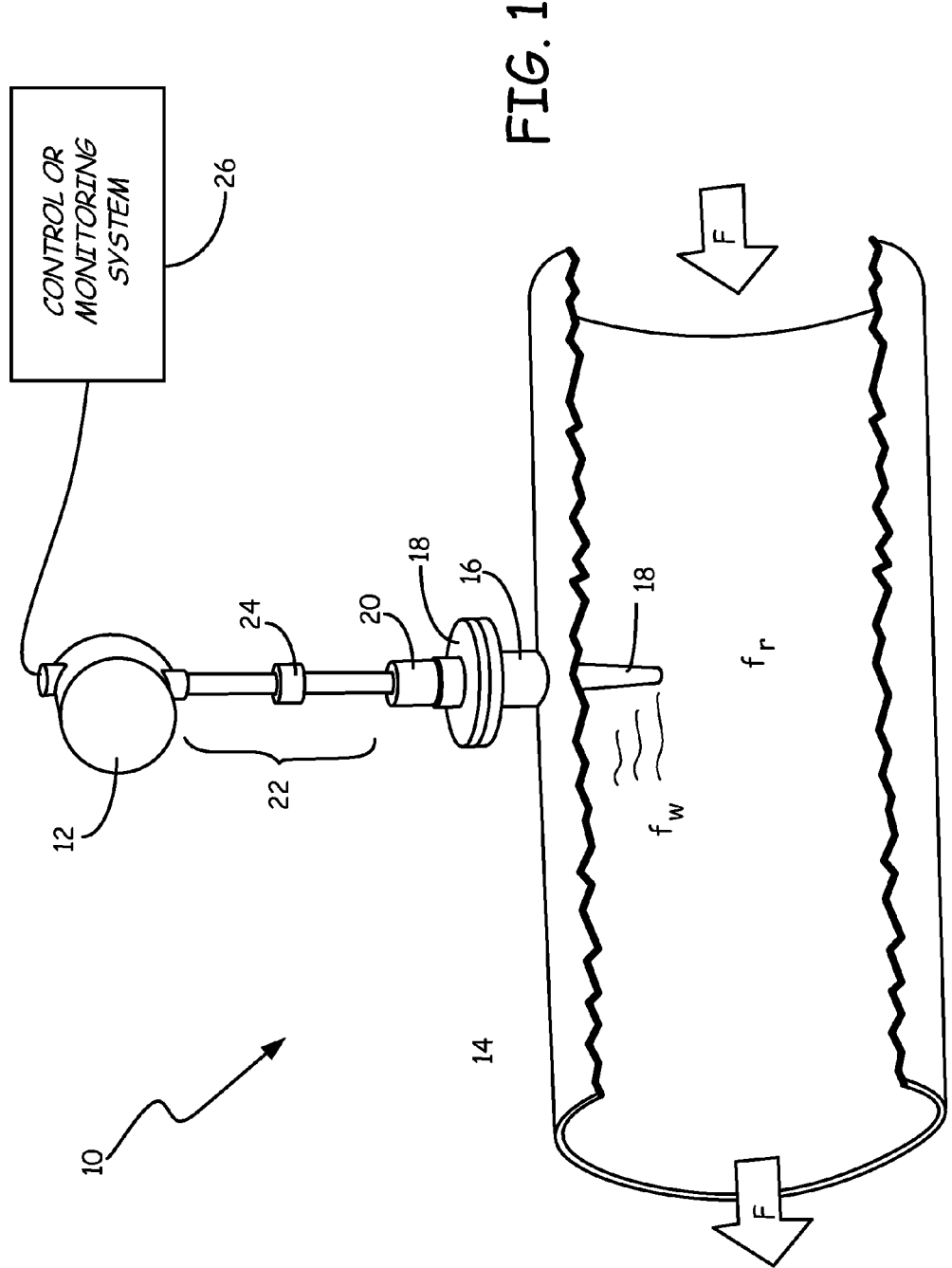
FIG. 1 is a simplified view of a process monitoring or control system according to the present invention.

FIG. 1 is a simplified cut-away view of one embodiment of process system 10, a system for monitoring and/or actuating an industrial fluid process. In the depicted embodiment, process system 10 includes process transmitter 12, process piping 14 (with flange connection 16), thermowell 18, process transducer 20, extension 22, vibration sensor 24, and control or monitoring system 26.

Process piping 14 carries process flow F for an industrial process. Process piping 14 may, for instance, be a tube or duct configured to carry a fluid such as an oil slurry, a viscous manufacturing material, a gas, or a liquid. Process piping 14 includes at least one flange connection 16 that facilitates the connection of a flange-mounted instrument to measure at least one characteristic of process flow F, such as temperature, flow rate, pressure, or pH. In the illustrated embodiment, flange connection 16 provides an attachment point for thermowell 18 and process transducer 20, and an aperture in process piping through which thermowell 18 and process transducer 20 can extend into process flow F. Process flow F may, for instance, include chemicals or particulates damaging or otherwise detrimental to the operation of process transducer 20.

Thermowell 18 is a protective body that surrounds process transducer 20 within process flow F. Thermowell 18 may, for instance, be a hollow tapered sheath affixed to and disposed through flange connection 16 into process flow F. Thermowell 18 is formed of a material with high thermal conductance, such as brass, steel, or copper, so as to efficiently conduct heat from process flow F to process transducer 20. Thermowell 18 has a characteristic natural resonance frequency $f_r$ determined by its geometry and construction.

Process transducer 20 is, in the depicted embodiment, a temperature sensor probe sheathed in thermowell 18, and capable of producing a process signal reflecting at least one temperature or change in temperature of process flow F proximate flange connection 16. Process transducer 20 may, for instance, be a thermocouple, resistive temperature detector, or thermistor. Thermowell 18 protects process transducer 20 from process flow F, preventing damage and increasing the expected lifetime of process transducer 20. Thermowell 18 also forms a fluid seal with flange connection 16, thereby preventing leakage of process flow F near process transducer 20. Thermowell 18 can, for instance, be bolted or clamped to flange connection 16. In some embodiments, process system 10 may include additional sealing components (gaskets, O-rings, etc.) disposed between thermowell 18 and flange connection 16 for an improved fluid seal.

Process transmitter 12 is a signal processing and/or transmission device that receives and processes signals from process transducer 20 to produce at least one measurement of a parameter of process flow F. Process transmitter 12 can, for instance, be a logic-capable device configured to extract a process measurement from electrical signals received from process transducer 20. Process transmitter 12 can further include diagnostic or failure reporting components, and can include persistent memory to store measurement, control, and diagnostic data relating to process flow F.

In the depicted embodiment, process transducer 20 is connected to process transmitter 12 via extension 22. As depicted, extension 22 is a rigid coupling that supports process transmitter 12 and carries signal wiring connecting process transmitter 12 to process transducer 20. Although process transmitter 12 is shown mounted on extension 22 at a separation from process transducer 20, some embodiments of process system 10 may utilize process transmitters mounted directly to process piping 14, flange connection 16, or process transducer 20, or mounted remotely. Process transmitter 12 can include an internal power source, and/or receive power from an external grid connection or energy harvesting device. In addition, as described in greater detail below with respect to FIGS. 2 and 3, process transmitter 12 may receive supplemental power from vibration sensor 24.

Vibration sensor 24 is a vibration-to-voltage transducer with a tunable vibrational energy harvester having natural resonant frequency $f_s$ closely matching resonant frequency $f_r$ of thermowell 18. In some embodiments, natural resonant frequency $f_s$ of vibration sensor 24 may, for instance, be tuned during manufacture by varying a tip mass or arm length of a vibrating arm of this vibrational energy harvester. In other embodiments, natural resonant frequency $f_s$ of vibration sensor 24 may be configurably tuneable, e.g. at its installation position in process system 10. Although vibration sensor 24 is depicted as situated on extension 22, alternative embodiments of process system 10 may include vibration sensor 24 situated in other locations, e.g. mounted directly to thermowell 18, process transducer 20, or process transmitter 12. Generally, vibration sensor 24 is situated proximate to thermowell 18 such that vortex shedding from thermowell 18 produces an output voltage from vibration sensor 24, as described below with respect to FIGS. 2 and 3. The amplitude of voltage produced by vibration sensor 24 corresponds to the proximity of $f_w$ to $f_s$. Because natural resonance frequency $f_s$ closely matches $f_r$, the voltage output amplitude of vibration sensor 24 constitutes a sensor signal reflecting proximity of $f_w$ to a resonance condition of thermowell 18. Extension 22 can, for instance, carry signal wiring transmitting this sensor signal from vibration sensor 24 to process transmitter 12.

Process transmitter 12 communicates with control or monitoring system 26, a central processing, data archiving, and/or monitoring system at a control or monitoring station that may oversee a plurality of process transmitters 12. Process transmitter 12 transmits process measurements to control or monitoring system 26, including temperature measurements obtained from process transducer 20, and vibration measurements obtained from vibration sensor 24. These process measurements may, for instance, be digitized counterparts to raw voltage and/or current signals from process transducer 20 and vibration sensor 24 produced by process transmitter 12. Although process system 10 illustrates only a single process transmitter 12 connected to control or monitoring system 26, some embodiments of process system 10 may include a plurality of process transmitters 12 sharing a common control or monitoring system 26. Similarly, although process transmitter is depicted attached to only one vibration sensor 24 and one process transducer 20, alternative embodiments of process system 10 may comprise multiple transducers and/or vibrational scavengers in communication with a single process transmitter 12. FIG. 1 illustrates a wired connection between process transmitter 12 and control or monitoring system 26. More generally, however, process transmitter 12 can communicate with control or monitoring system 26 via a multi-wire cable, fiber optic cable, or a wireless connection. In some embodiments, process transmitter 12 may communicate with control or monitoring system 26 via a wireless connection operating on a WirelessHART protocol or similar transmission/reception protocol. In addition to the process and vibration measurements, process transmitter 12 may provide control or monitoring system 26 with diagnostic or log information and fault alerts. Similarly, control or monitoring system 26 may issue data, reset, or calibration requests, or other commands, to process transmitter 12.

Process piping 14 channels process flow F past thermowell 18, which houses and protects process transducer 20 from direct contact with process flow F while leaving process transducer 20 in indirect thermal contact with process flow F. As process flow F passes by and around thermowell 18, impingement of thermowell 18 on process flow F stirs up turbulence downstream of thermowell 18. This vortex shedding produces turbulence with a characteristic wake frequency $f_w$ as described above. By matching the resonant frequencies of thermowell 20 and vibration sensor 24, process system 10 allows vibration sensor 24 to produce a measure of resonance between turbulent process flow F and thermowell 20, thereby enabling process transmitter 12 and/or control or monitoring system 26 to recognize when thermowell 20 experiences or nears a potentially damaging resonance condition corresponding to $f_w=f_r=f_s$. In this way, process system 10 enables faults in thermowell 20 to be detected before thermowell 20 fails altogether.

Figure 2:
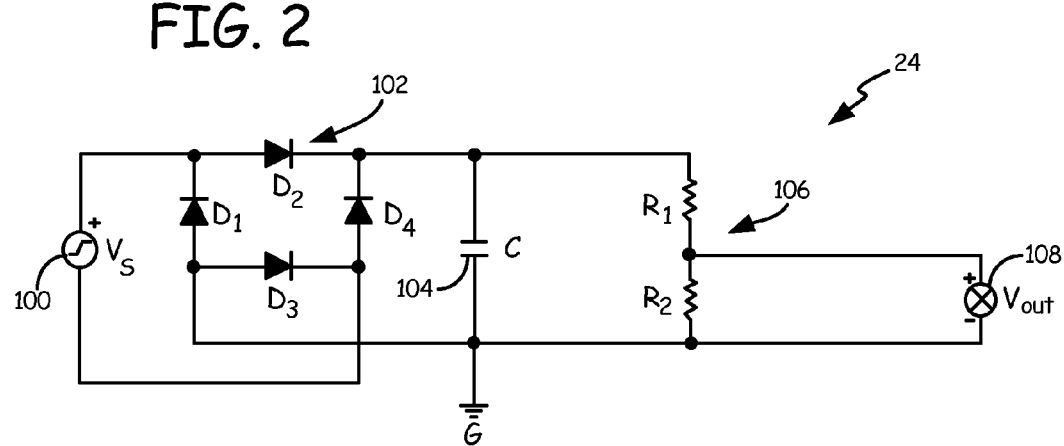
FIG. 2 is a circuit diagram of an energy scavenging vibration transducer for the process monitoring and control system of FIG. 1

FIG. 2 is a schematic diagram of vibration sensor 24, comprising vibrational energy harvester 100 (with signal voltage $V_s$), rectifier 102 (with diodes $D_1$, $D_2$, $D_3$, and $D_4$), smoother 104 (with capacitor C), voltage divider 106 (with resistors $R_1$ and $R_2$), and output terminal 108 (with output voltage $V_{out}$). Generally, any non-powered device with output proportional to vibration can be substituted for vibrational energy harvester 100. As described above with respect to FIG. 2, vibrational energy harvester 100 is selected or tuned such that resonant frequency $f_s$ of vibrational energy harvester 100 closely matches resonant frequency $f_r$ of thermowell 18. Resonant frequency $f_r$ can, for instance, be calculated according to ASME PTC 19.3TW or a similar industrial standard, or tested empirically. Tuning may be accomplished, for example, by varying a tip weight or arm length of a vibration probe within vibrational energy harvester 100 as is well known in the art. Vibrational energy harvester 100 produces alternating current (AC) with period and amplitude corresponding to mechanical vibration at vibration sensor 26. Vibrational harvester 100 serves as an AC voltage source with signal voltage $V_s$. Rectifier 102, smoother 104, and voltage divider 106 together comprise signal conditioning electronics to produce output voltage $V_{out}$ from signal voltage $V_s$. Rectifier 102 rectifies signal voltage $V_s$ to produce a direct current (DC) signal. Rectifier 102 is depicted as a full-wave four-bridge rectifier with four diodes $D_1$, $D_2$, $D_3$, and $D_4$. Although the depicted embodiment is simple and cost-effective, other types of rectifiers may equivalently be used, including half-wave rectifiers and transistor full-wave rectifiers. Some embodiments of vibration sensor 24 may eschew rectifier 102, and instead rapidly sample the AC signal produced by energy harvester 100. Smoother 104 removes transients from the DC output of rectifier 102. In the depicted embodiment smoother 104 comprises a single capacitor C connected to ground. Voltage divider 106 scales the resulting smooth DC signal to produce a normalized output voltage signal $V_{out}$ at output terminal 108. This output voltage signal $V_{out}$ can, for instance, be digitized by process transmitter 12 (see FIG. 1, discussed above) to produce a digital measurement of resonance near thermowell 18, or can be processed in analog. In some alternative embodiments, $V_{out}$ or $V_s$ may be coupled with a process sensor signal from transducer 20, thereby allowing the combined signal to be received at a single terminal of process transmitter 12 and decoupled digitally.

$V_{out}$ is not a direct measure of vibration amplitude at thermowell 18. Rather, since $f_r \approx f_s$, vibrational energy harvester 100 will tend to maximize signal voltage $V_s$ (and correspondingly output voltage $V_{out}$) at resonance conditions of thermowell 18. Accordingly, $V_{out}$ of vibration sensor 24 provides a measure of proximity between the frequency of vibration of thermowell 18 (due primarily to vortex shedding with wake frequency $f_w$) and thermowell resonance frequency $f_r$. Where $f_w$ is remote from $f_r$, $V_{out}$ is small, and there is little risk of harmful resonance between thermowell 18 and turbulence of process flow F. Where $f_w$ is close to $f_r$, $V_{out}$ is comparatively large, corresponding to increased resonance and increased vibration in thermowell 18. Thus, large values of $V_{out}$ correspond to potentially hazardous resonance conditions of thermowell 18. This relationship is discussed in greater detail below with respect to FIG. 3.

As disclosed in FIG. 2, vibration sensor 24 comprises a unpowered sensor with relatively simple wiring. Because vibrational energy harvester 100 produces an AC voltage signal reflecting vibration amplitude directly from mechanical vibration of vibration sensor 24, no supplemental power source is needed to run vibration sensor 24. In some embodiments, additional power from vibrational energy harvester 100 can be routed to process transmitter 12 and/or used to power a visual or audio indication indicating a resonance condition.

Figure 3:
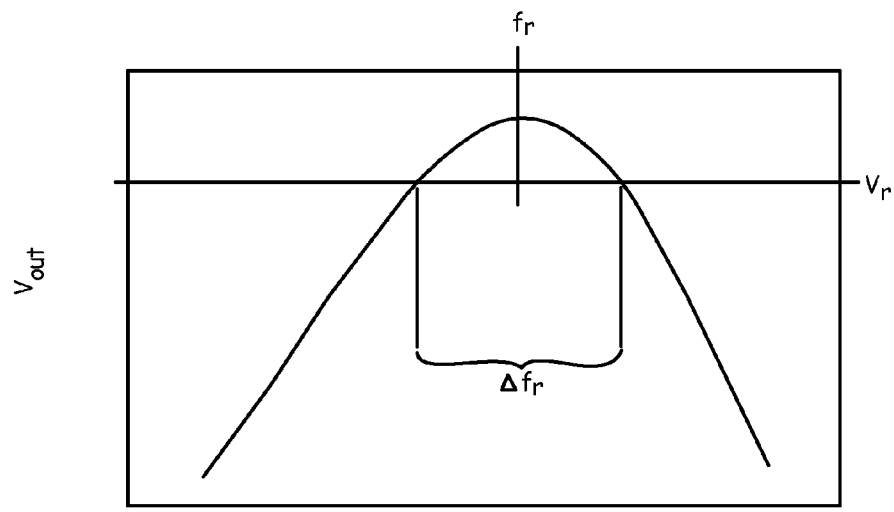
FIG. 3 is a graph voltage versus frequency illustrating the effect of vibration at a resonant frequency of the energy scavenging vibration sensor of FIG. 2.

FIG. 3 depicts an exemplary plot of output voltage $V_{out}$ as a function of wake frequency $f_w$. As described above with respect to FIG. 2, output voltage $V_{out}$ is maximized at the $f_s$, the resonance frequency of vibrational energy harvester 100. Vibrational energy harvester 100 is tuned or selected such that $f_s \approx f_r$. Accordingly, $V_{out}$ peaks at or near $f_w = f_s \approx f_r$, corresponding to a resonance condition of thermowell 18 likely to produce harmful vibrations in thermowell 18. FIG. 3 illustrates resonance range $\Delta f_r$ about resonance frequency $f_r$. Resonance range $\Delta f_r$ corresponds to frequency band of wake frequencies $f_w$ sufficiently close to $f_r$ to cause harmful vibration in thermowell 18. Sensed vibration frequencies within resonance range $\Delta f_r$ produce output voltages $V_{out} \geq V_r$, a resonance threshold voltage. Process transmitter 12 and/or control or monitoring system 26 can, for instance, flag thermowell 18 for replacement or throw an alarm when $V_{out} > V_r$, particularly if $V_{out} > V_r$ for an extended time. Resonance threshold voltage $V_r$ can be selected based on machine tolerances, precision of tuning of $f_s$ to $f_r$, and precision in estimation of $f_r$. In alternative embodiments, process transmitter 12 and/or control or monitoring system 26 may record output voltage $V_{out}$ without comparison to any resonance threshold voltage $V_r$.

Vibration sensor 24 provides a compact and inexpensive means for detecting potentially harmful resonance conditions of thermowell 18 prior to part failure. For ease of distribution and installation, thermowells can be coded and/or sold together with corresponding vibration sensors with matching resonant frequencies ($f_s \approx f_r$), allowing an end user to select the appropriate vibration sensor 24 to each thermowell 18 rather than personally tuning vibration sensor 24. Vibration sensor 24 draws no external power, and thus does not require a power from process transmitter 18 or a separate power source. In some embodiments, vibration sensor 24 may instead supply power to process transmitter 12, either supplementing or replacing power from other sources.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A sensor system comprising:
   a process transducer disposed within a thermowell and configured to produce a first sensor signal;
   an unpowered vibration sensor comprising a vibrational energy harvester configured to produce an alternating current from vibration near the thermowell, and signal conditioning electronics configured to produce, from the alternating current, a second sensor signal reflecting vibration of the thermowell; and
   a process transmitter configured to receive, process, and transmit the first and second sensor signals.

2. The sensor system of claim 1, wherein the process transducer is disposed to sense a parameter of a process fluid, and wherein the first sensor signal reflects the parameter of the process fluid.

3. The sensor system of claim 2, wherein the process transducer is a temperature sensor, and the first sensor signal is a temperature signal.

4. The sensor system of claim 2, wherein impingement of the process fluid on the thermowell causes the vibration of the thermowell.

5. The sensor system of claim 1, wherein the vibrational energy harvester and the thermowell have a common resonant frequency.

6. The sensor system of claim 1, wherein the second sensor signal is a processed output voltage amplitude of the vibrational energy harvester.

7. The sensor system of claim 1, wherein the signal processing electronics comprise a rectifier, a smoother, and a voltage divider.

8. The sensor system of claim 1, wherein the second sensor signal reflects proximity between a frequency of the vibration of the thermowell and a resonant frequency of the thermowell.

9. The sensor system of claim 1, further comprising a control or monitoring system to which the process transmitter transmits the first and second sensor signals.

10. The sensor system of claim 9, wherein the process transmitter or the control or monitoring system flags an alarm condition based on the second sensor signal.

11. The sensor system of claim 10, wherein the process transmitter or the control or monitoring system flags the alarm condition in response to the second sensor signal rising or remaining above a threshold value.

12. A process system for monitoring a process fluid, the process system comprising:
   a thermowell extending into the process fluid;
   a process transducer sheathed in the thermowell, and configured to produce a process signal reflecting a property of the process fluid;
   a unpowered vibration sensor situated near the thermowell, and configured to produce a vibration signal reflecting vibration near the thermowell, the unpowered vibration sensor comprising:
      a vibrational energy harvester configured to produce an alternating current from vibration near the thermowell; and
      signal conditioning electronics configured to produce an output signal from the alternating current; and a process transmitter configured to receive and process the process signal and the vibration signal.

13. The process system of claim 12, wherein the process transducer is a temperature sensor and the property of the process fluid is a temperature or a change in temperature in the process fluid.

14. The process system of claim 12, wherein the process transmitter is configured to flag an alarm condition if an amplitude of the vibration signal rises above a threshold value.

15. The process system of claim 12, wherein the signal conditioning electronics include a full-wave rectifier to convert the alternating current into direct current.

16. The process system of claim 12, wherein the signal conditioning electronics include a capacitor to smooth transient signals.

17. The process system of claim 12, wherein the signal conditioning electronics include a voltage divider comprised of a plurality of resistors to scale the output signal.

18. The process system of claim 12, wherein the vibrational energy harvester is tuned to share a common resonant frequency with the thermowell.

19. The process system of claim 12, wherein the unpowered vibration sensor at least partially powers the process transmitter.

20. The process system of claim 12, further comprising a control or monitoring system in communication with the process transmitter to receive process and vibration measurements based on the process signal and the vibration signal, respectively.

21. The process system of claim 12, wherein the unpowered vibration sensor is affixed to a rigid coupling extending from the process transducer to the process transmitter.

22. The process system of claim 12, wherein the thermowell extends through process piping carrying the process fluid.

* * * * *